(12) United States Patent
Saikawa (10) Patent No.: US 8,634,097 B2
(45) Date of Patent: *Jan. 21, 2014

(54) MEDIUM PROCESSING APPARATUS AND CONTROLLING METHOD OF THE SAME

(75) Inventor: Takashi Saikawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/566,279

(22) Filed: Aug. 3, 2012

(65) Prior Publication Data

US 2012/0327469 A1    Dec. 27, 2012

Related U.S. Application Data

(63) Continuation of application No. 12/218,574, filed on Jul. 16, 2008.

(30) Foreign Application Priority Data

Jul. 17, 2007    (JP) ................................. 2007-186103

(51) Int. Cl.
*G06F 3/12*    (2006.01)
*G06Q 40/00*    (2012.01)
*B41J 11/44*    (2006.01)

(52) U.S. Cl.
USPC ............................. 358/1.15; 235/379; 400/76

(58) Field of Classification Search
USPC ............................. 358/1.15; 400/76; 235/379
See application file for complete search history.

(56) References Cited

U.S. PATENT DOCUMENTS

| 6,198,985 | B1 | 3/2001 | Miyasaka et al. |
| 6,205,363 | B1 * | 3/2001 | Miyasaka et al. ................. 700/9 |
| 6,208,906 | B1 | 3/2001 | Miyasaka et al. |
| 6,360,135 | B1 | 3/2002 | Miyasaka et al. |
| 6,362,896 | B1 | 3/2002 | Miyasaka et al. |
| 6,434,445 | B2 | 8/2002 | Miyasaka et al. |
| 6,453,208 | B2 | 9/2002 | Miyasaka et al. |

(Continued)

FOREIGN PATENT DOCUMENTS

| EP | 1106368 A2 | 6/2001 |
| JP | 07172032 A | 7/1995 |
| JP | 09-164747 A | 6/1997 |
| JP | 09164746 A | 6/1997 |
| JP | 11-203098 A | 7/1999 |
| JP | 11203098 A | 7/1999 |
| JP | 2004032119 A | 1/2004 |
| JP | 2004341934 A | 12/2004 |

(Continued)

OTHER PUBLICATIONS

European Search Report for Application No. 08012681.6, Mailed Jul. 28, 2009.

(Continued)

*Primary Examiner* — Twyler Haskins
*Assistant Examiner* — Justin Katzwhite
(74) *Attorney, Agent, or Firm* — Nutter McClennen & Fish LLP; John J. Penny, Jr.; Christina M. Sperry (57) ABSTRACT

A receiver configured to receive a first command that contains a predetermined code string and a second command that does not contain the predetermined code string from a host computer. A first command analyzer configured to analyze and process only the first command received by the receiver. A buffer configured to temporarily store at least the second command received by the receiver. A second command analyzer configured to analyze and process the second command stored by the buffer. A sound generator configured to generate a sound when the first command analyzer analyzes the first command and determines that the first command includes a sound generating command. The first command analyzer analyzes the first command before the buffer temporarily stores the first command.

18 Claims, 3 Drawing Sheets

(56) References Cited

U.S. PATENT DOCUMENTS

| | | | |
|---|---|---|---|
| 6,612,759 B2 * | 9/2003 | Fukano et al. | 400/74 |
| 6,697,678 B2 | 2/2004 | Miyasaka et al. | |
| 6,975,423 B2 | 12/2005 | Koakutsu et al. | |
| 7,219,831 B2 | 5/2007 | Murata | |
| 2001/0021954 A1 | 9/2001 | Takamizawa et al. | |
| 2001/0024585 A1 * | 9/2001 | Koakutsu et al. | 400/76 |
| 2001/0032954 A1 | 10/2001 | Kawolics et al. | |
| 2001/0045452 A1 * | 11/2001 | Momose et al. | 235/379 |
| 2005/0127160 A1 | 6/2005 | Fujikawa | |
| 2007/0205264 A1 | 9/2007 | Murata | |
| 2009/0021787 A1 | 1/2009 | Saikawa | |

FOREIGN PATENT DOCUMENTS

| | | |
|---|---|---|
| JP | 2005149013 A | 6/2005 |
| JP | 2005-326945 A | 11/2005 |

OTHER PUBLICATIONS

Office Action in U.S. Appl. No. 12/218,574 dated Jul. 14, 2011.
Office Action in U.S. Appl. No. 12/218,574 dated Dec. 1, 2011.
Office Action in U.S. Appl. No. 12/218,574 dated Mar. 1, 2011.
Notice of Allowance in U.S. Appl. No. 12/218,574 dated May 2, 2012.

* cited by examiner

MEDIUM PROCESSING APPARATUS AND CONTROLLING METHOD OF THE SAME

Priority is claimed to U.S. patent application Ser. No. 12/218,574 filed Jul. 16, 2008, which claims priority to Japanese Patent Application No. 2007-186103 filed Jul. 17, 2007, the disclosures of which, including the specifications, drawings, and claims, are incorporated herein by reference in their entireties.

BACKGROUND

The present invention relates to a medium processing apparatus and a controlling method of the same.

In a peripheral apparatus that performs a predetermined printing process by analyzing data received from a host computer, a function for generating a sound in accordance with a status of the peripheral apparatus has already been disclosed. For example, Patent Document 1 (Japanese Patent Publication No. 07-172032A) discloses a technique for determining a printing status of a printer by notifying a printer status or a change of the printer status using a sound.

The printer disclosed in Patent Document 1 determines whether to notify a status using a sound when the status of satisfying a determination condition occurs in the printer. The determination condition is selectively designated by a command from a manual operation panel or a host computer. In addition, effectiveness of notification carried out by a buzzer is set in advance in accordance with the determination condition. For example, when the printer enters an offline state in accordance with the command from the host computer, a buzzer sound is configured so as to be generated. In this case, when the printer enters the offline state, it is determined whether a function for generating an offline sound is effective. If the offline sound is effective, a predetermined buzzer sound rings. That is, the printer can recognize its state and can generates a buzzer sound in accordance with the state under a predetermined set condition.

Recently, in order to improve effectiveness of check processing, a process of electromagnetically reading checks has started to be attempted. For example, the process of electromagnetically reading checks has started to be attempted at banks Accordingly, a small check processing apparatus that can be installed at a bank has been suggested.

In the check processing apparatus, a magnetic ink reading device and a scanner are provided in a check transporting passage. When a bank staff receives checks from a client and allows the checks to be passed in the check processing apparatus, the check processing apparatus performs a reading process that reads magnetic ink characters or images on each of the checks, and endorses the checks. Information read from the magnetic ink characters or the images is transmitted to a host computer. The host computer receives the information and checks whether the information read from the magnetic ink characters or the images are correctly read. Then, the host computer transmits a command notifying a next process to the check processing apparatus in accordance with the check result (see Patent Document 2, Japanese Patent Publication No. 2005-149013A).

In this way, in the check processing apparatus, the process of reading data is performed in accordance with a reading command transmitted from the host computer and the read information is transmitted to the host computer. Basically, the check processing apparatus only performs a process in accordance with a command of the host computer, and the host computer performs an authentication process or the like that is needed for a high speed processing capability. With such a configuration, a high speed reading process performed by the check processing apparatus is designed.

It is considered that the technique disclosed in Patent Document 1 can be employed in the technique disclosed in Patent Document 2 in order to generate a buzzer sound in accordance with a reading result of the check reading process. For example, when a buzzer sound rings in a case where the reading process fails, an operator hears the buzzer sound and can recognize that the reading process has failed.

However, the stand-alone check processing apparatus disclosed in Patent Document 2 cannot generate the buzzer sound in accordance with an authentication result since check processing apparatus does not authenticate the read information. That is, the check processing apparatus cannot generate the buzzer sound as long as the check processing apparatus does not receive a command for generating a buzzer sound notifying the performance of a process in accordance with the authentication result.

When the command for generating the buzzer sound is separately generated in this way, the check processing apparatus can generate the buzzer sound in any state.

Generally, the command transmitted from the host computer is received by an apparatus in an online state, and the apparatus receiving the command analyzes the command to perform a process in accordance with the analysis result. Conversely, the apparatus cannot perform a process in an offline state in accordance with the command since the apparatus cannot analyze the command in the offline state. Moreover, when a large amount of data has been accumulated in a receiving buffer, even an apparatus in an online state may not be able to generate the buzzer sound in real time in some cases since a priority command such as one that generates a buzzer sound has to be sequentially analyzed and executed in a normal order.

The "offline state" refers to a state where data or command is transmitted from a host computer and received in the receiving buffer, but the received data or command is not analyzed and no process is performed. For example, the apparatus enters an offline state when a sheet jam error occurs or a sheet passage cover is opened.

SUMMARY

It is therefore an object of at least one embodiment of the invention to provide an apparatus which is connected to a host computer to communicate therewith and is capable of preferentially generating a sound in accordance with a command from the host computer regardless of whether the apparatus is in an online state or an offline state.

According to an aspect of at least one embodiment of the invention, a first command (specific command) that contains a predetermined code string is analyzed and processed by a first command analyzer before being stored in a buffer. On the other hand, a second command (normal command) which does not contain the predetermined code string is analyzed and processed by a second command analyzer after being stored in the buffer. Generally, since a command analyzer processes commands and data in an order of receiving the commands and the data, the command analyzer does not preferentially execute a predetermined command. In the aspect of at least one embodiment of the invention, since the first command is executed before being stored in the buffer, the first command can be executed in preference to the second command. That is, the first command analyzer executes the first command regardless whether a medium processing apparatus is in an online state or in an offline state. Accordingly, when the first command is a sound generating command, a sound is generated in preference to the other processes.

According to an aspect of at least one embodiment of the invention, the first command is generated in the host computer in accordance with status information which is generated by a status information generator. After a sound has been generated in response to the sound generating command, if a status of the medium processing apparatus is changed, the status information is again generated and is transmitted to the host computer. Then, the host computer again generates the sound generating command and transmits it to the medium processing apparatus. As a result, it is possible to generate the sound repeatedly regardless of whether the medium processing apparatus is in the online state or in the offline state.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an embodiment of the invention will be described in detail with reference to the drawings. In addition, in this embodiment of the invention, as an example of an information reading apparatus, a medium processing system constituted by a host computer and a medium processing apparatus for performing a reading process in accordance with an instruction of the host computer will be described.

(Mechanical Configuration of Medium Processing Apparatus)

Figure 1:
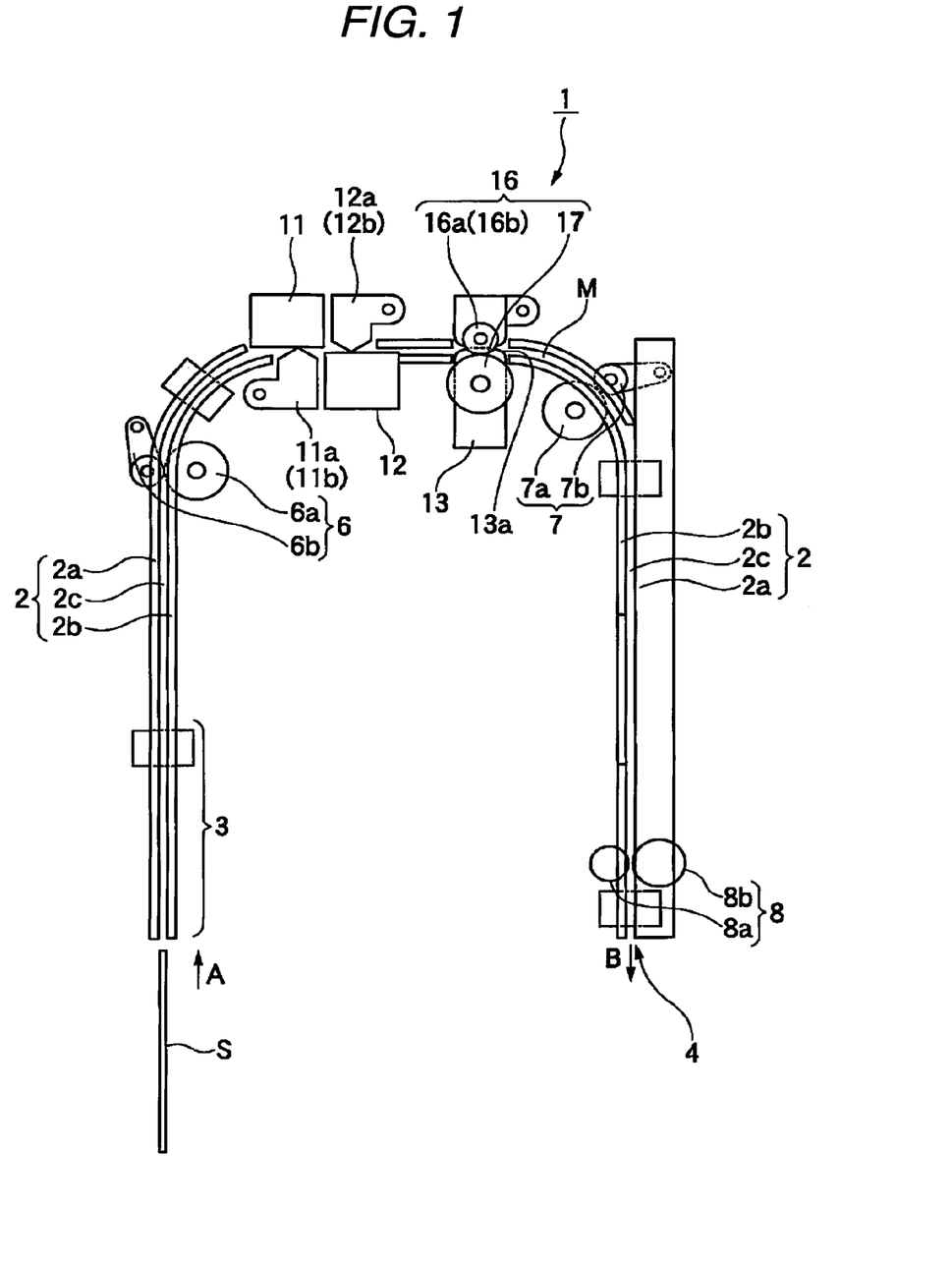
FIG. 1 is a schematic diagram illustrating a sheet transporting passage of the medium processing apparatus which constitutes the medium processing system according to the embodiment of the invention.

As shown in FIG. 1, the medium processing apparatus 1 according to the invention is configured so as to read images on both sides of a single sheet of medium and magnetic ink characters on the single sheet of medium while transporting the single sheet of transported medium such as a check in an ASF (Auto Sheet Feeder) 3 that functions as a feeding unit along a sheet transporting passage 2 formed in a case.

The sheet transporting passage 2 for transporting a check S is formed in a substantially U shape. A portion corresponding to the bottom portion of the U shape is configured as an intermediate transport passage M. Various reading devices are provided along the intermediate transport passage M. The sheet transporting passage 2 is constituted by a transport portion 2c partitioned between an outer guide 2a and an inner guide 2b, and the check S is transported along the transport portion 2C.

The ASF 3 for loading the a plurality of checks is provided on the upstream side of the sheet transporting passage 2. The plurality of checks are inserted into the sheet transporting passage 2 through the ASF 3 in a direction indicated by arrow A. The plurality of checks loaded in the ASF 3 are separated one by one to be transported into the sheet transporting passage 2.

Along the sheet transporting passage 2, as transport units for transporting the check S, a sheet transport roller 6 is provided on the upstream side of the intermediate transport passage M, an intermediate transport roller 16 is provided in the intermediate transport passage M, a second transport roller 7 is provided on the downstream side of the intermediate transport passage M, and a discharging roller 8 is provided in front of a discharging port 4. The sheet transport roller 6 includes a driving roller 6a and a pressing roller 6b disposed so as to face the driving roller 6a through the sheet transporting passage 2. The second transport roller 7 includes a driving roller 7a and a pressing roller 7b disposed so as to face the driving roller 7a through the sheet transporting passage 2. The intermediate transport roller 16 includes a lower pressing roller 16a disposed below the sheet transporting passage 2, an upper pressing roller 16b disposed above the lower pressing roller 16a, and a driving roller 17 disposed so as to face the upper pressing roller 16b and the lower pressing roller 16a through the intermediate transport passage M.

The check S loaded from the ASF 3 to the sheet transporting passage 2 is transported along the intermediate transport passage M by the sheet transport roller 6, the intermediate transport roller 16, and the second transport roller 7 to be discharged from the discharging port 4 in a direction indicated by arrow B by the discharging roller 8.

Along the intermediate transport passage M, an image reading device 11 and a second image reading device 12 for reading images on a sheet are disposed in a transport direction on both sides of the intermediate transport passage M while being deviated from each other. The sheet image reading device 11 and the second sheet image reading device 12 are CIS (Contact Image Sensor) type scanners. For each sheet, the image reading device 11 and the second image reading device 12 for a sheet irradiate light on one surface of the check S transported along the intermediate transport passage M, receive the reflected light through a plurality of light-receiving elements (photoelectric conversion elements), and convert the received light into an electric signal to acquire one line of image. In this embodiment, the image reading device 11 reads images on the rear surface of the check S one line by one line and the second image reading device 12 reads images on the surface of the check S one line by one line to acquire two-dimensional images of the check S.

An MICR (Magnetic Ink Character Reader) 13 for reading magnetic ink characters is disposed below the driving roller 17. The MICR 13 is a sensor for reading magnetic ink characters printed on the surface of the check S. The MICR 13 performs the reading in a state where the check S is pressed against the surface of the MICR 13 by a pressing lever disposed so as to face the MICR 13 through the intermediate transport passage M. In this case, a magnetic ink character area of the check S where information such as an account number or the like is printed in the form of magnetic ink characters is read.

Process in Medium Processing System>

Figure 2:
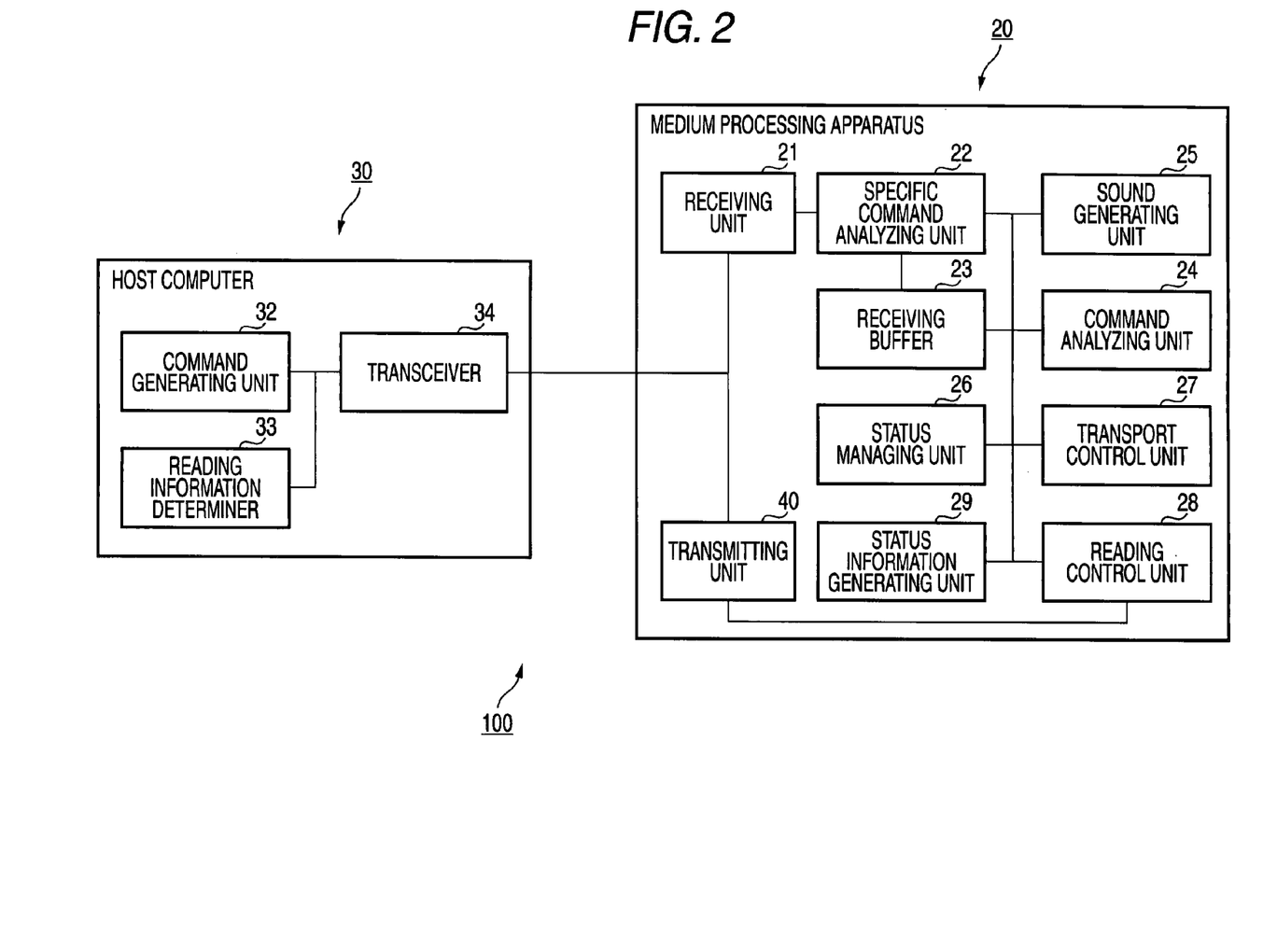
FIG. 2 is a functional block diagram illustrating the process in the medium processing system.

Next, a process in the medium processing system will be described with reference to FIG. 2. A medium processing system 100 is constituted by a host computer 30 and a medium processing apparatus 20.

(Process in Host Computer)

The host computer 30 mainly includes a command generating unit 32, a reading information determiner 33, and a transceiver 34.

The command generating unit 32 generates commands for allowing the medium processing apparatus 20 to perform various operations. Specifically, examples of the commands may include a transporting command for driving the transport rollers to transport the check S along the transport passage, a reading command for allowing the image reading devices 11 and 12 to perform an image reading process, or a reading command for allowing the MICR 13 to perform a process of reading magnetic ink characters. In addition, the command generating unit 32 generates a sound generating command for ringing a buzzer (not shown) included in the medium processing apparatus 20.

The reading information determiner 33 performs a process of recognizing read information read by the medium processing apparatus 20. Specifically, the reading information determiner 33 performs a process of making a right or wrong determination (for example, CAR/LAR (Courtesy Amount Recognition/Legal Amount Recognition), IQA (Image Quality Assurance), etc.) for image data read by the image reading devices 11 and 12, an OCR (Optical Character Recognition) process, and an MICR (Magnetic Ink Character Recognition) process.

The transceiver 34 is an interface for transmitting and receiving data to and from the medium processing apparatus 20. The transceiver 34 transmits the various commands generated by the command generating unit 32 or receives the read information from the medium processing apparatus 20.

In this embodiment, the command generating unit 32 can generate a sound generating command in accordance with status information transmitted from the medium processing apparatus 20 or in accordance with the determination result of the reading information determiner 33. For example, the command generating unit 32 generates a sound generating command for ringing the buzzer in order to notifying an operator that the reading process has fails when the reading information determiner 33 has determined that the image data cannot be normally read.

When status information notifying the openness of a transport unit cover is transmitted from the medium processing apparatus 20, the command generating unit 32 generates a sound generating command for ringing the buzzer on the basis of status information in order to notify the operator that the transport unit cover is in an open state. In addition, when the transport unit cover is opened, an online state of the medium processing apparatus 20 is changed into an offline state.

Here, the "status information" refers to information for notifying a state of the medium processing apparatus 20 to the host computer. For example, if sheet jamming occurs, status information for notifying the occurrence of the sheet jamming is created. If it is detected that a transport passage cover (not shown) for covering the transport portion 2*c* is opened, status information for notifying the cover openness is created. If the check S is loaded on the ASF 3 and it is detected that the check S has been loaded, status information for noting the loading of the check S is created.

(Process in Medium Processing Apparatus)

The medium processing apparatus 20 generally includes a receiving unit 21, a specific command analyzing unit 22, a receiving buffer 23, a command analyzing unit 24, a sound generating unit 25, a status managing unit 26, a transport control unit 27, a reading control unit 28, a status information generating unit 29, and a transmitting unit 40.

The receiving unit 21 is an interface which receives data transmitted from the host computer 30. When the date received by the receiving unit 21 is a specific command, the specific command analyzing unit 22 analyzes and processes the data. Alternatively, when the received data is not the specific command, that is, when the received data is a normal command, the data is stored temporarily in the receiving buffer 23. The command analyzing unit 24 sequentially reads and analyzes the data stored in the receiving buffer 23, and the status managing unit 26 instructs each control unit in accordance with the analysis result.

When a specific command is analyzed and performed by the specific command analyzing unit 22, the specific command is stored temporarily in the receiving buffer 23 along with normal commands. However, even though the command analyzing unit 24 reads the specific command from the receiving buffer 23, the specific command is not performed by the command analyzing unit 24 and treated by the command analyzing unit 24 as garbage data.

When the command analyzing unit 24 analyzes the data and the data is a transporting command, the status managing unit 26 instructs the transport control unit 27 to transport the check S. In addition, when the received data is a reading command, the status managing unit 26 instructs the reading control unit 28 to read images on the surface of the check S, images on the rear surface thereof, and magnetic ink characters thereon. The transport control unit 27 controls a transport mechanism including a motor and the like that drives driving rollers. The reading control unit 28 controls reading operations of the image reading devices 11 and 12 and the MICR 13.

The reading control unit 28 transmits information read by the image reading devices 11 and 12 and the MICR 13 to the host computer 30 through the transmitting unit 40.

The status managing unit 26 controls the entire operations of the medium processing apparatus 20. When a change occurs at each unit, the status information generating unit 29 generates status information. The generated status information is transmitted to the host computer 30 through the transmitting unit 40.

The specific command analyzing unit 22 recognizes the specific command and analyzes the specific command when the received data contains a predetermined code string. When the specific command is analyzed as the sound generating command, a buzzer is rung by the sound generating unit 25. Alternatively, when the received data does not contain the predetermined code string, the specific command analyzing unit 22 does not perform the command analysis because the command is recognized as a normal command and stores the data in the receiving buffer 23.

In contrast to the specific command, the command analyzing unit 24 for analyzing and processing normal commands only sequentially analyzes the data received in the receiving buffer 23. Accordingly, when a large amount of data is received in the receiving buffer 23, it is difficult to instruct a process to be performed in real time using the normal command. In consideration of such a circumstance, the specific command analyzing unit 22 according to this embodiment analyzes and processes the specific command before the specific command is received in the receiving buffer 23. Accordingly, the specific command can be preferentially processed. Moreover, the specific command analyzing unit 22 can analyze and process the specific command transmitted from the host computer 30, irrespective of the online state or the offline state of the medium processing apparatus 20. Accordingly, it is possible to preferentially process a sound generating command, irrespective of the online state or the offline state of the medium processing apparatus 20.

<Process of Generating Buzzer Sound>

Figure 3:
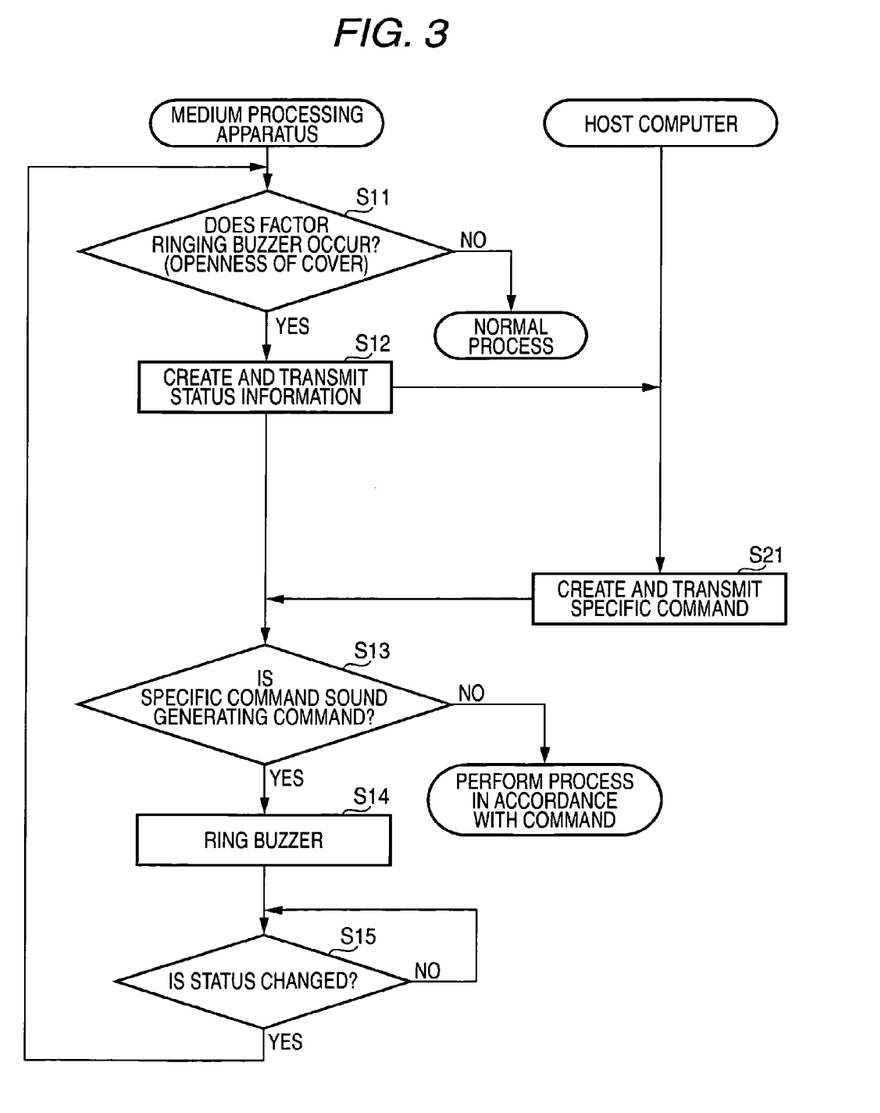
FIG. 3 is a flowchart for explaining a process of generating a buzzer sound.

Next, a process of generating a buzzer sound performed by the medium processing apparatus 20 constituting the medium processing system 100 according to this embodiment will be described with reference to FIG. 3.

Here, as a factor in which it is necessary to ring the buzzer of the medium processing apparatus 20, a case where the cover of the transport portion 2c is opened will be described. When the cover of the transport portion 2c is opened, the medium processing apparatus 20 enters the offline state, and the command analyzing unit 24 does not analyze normal commands stored in the receiving buffer 23. On the other hand, specific commands will be analyzed and processed by the specific command analyzing unit 22, irrespective of the online state and the offline state of the medium processing apparatus 20 before the specific command is stored in the receiving buffer 23. Accordingly, it is possible to ring the buzzer in accordance with various cases, irrespective of either the online state or the offline state of the medium processing apparatus 20 by beforehand setting various cases where it is necessary to ring the buzzer.

When the cover of the transport portion 2c becomes opened (Yes in Step S11) as the case where it is necessary to ring the buzzer of the medium processing apparatus 20, the status managing unit 26 detects that the cover has been opened. The status information creating unit 29 creates cover-open status information indicating that the cover has been opened, in accordance with an instruction of the status managing unit 26, and transmits the cover-open status information to the host computer through the transmitting unit 40 (Step S12).

The command generating unit 32 generates the specific command containing the predetermined code string on the basis of the cover-open status information, and transmits the specific command to the medium processing apparatus 20 (Step S21). At this time, the predetermined code string refers to a code string that can be clearly distinguished from the normal command. For example, a code string of [DLE, DC4, fn, a, n, r, t1, t2], having an initial code (DLE) (10h in hexadecimal) that is different from the code string of the normal command can be taken into consideration.

When the receiving unit 21 of the medium processing apparatus 20 receives the specific command, the specific command analyzing unit 22 analyzes the specific command. The specific command analyzing unit 22 determines that the received command is a specific command when reading the initial code (DLE). In addition, the specific command analyzing unit 22 determines from parameters contained in the specific command whether the specific command is the sound generating command (Step S13).

The parameters contained in the specific command can be set as follows:

a: type of a buzzer sound, n: volume of a buzzer sound, r: number of buzzer sound's ringing, t1: time when a buzzer sound rings [t1.times.100 ms], and t2: time when a buzzer sound stops [t2.times.100 ms].

The ringing pattern of the buzzer sound can be set on the basis of the parameters. Accordingly, it is possible to change the ringing pattern in accordance with the type of status information.

When the specific command is analyzed as a sound generating command (Yes in Step S13), the sound generating unit 25 rings the buzzer of the medium processing apparatus 20 (Step S14). When the status managing unit 26 detects that the status has been changed after a buzzer sound designated by the sound generating command is rung (Yes in Step S15), the process is returned to Step S11 and it is determined whether a factor by which the buzzer is rung has occurred.

Here the status has been changed in Step S15 refers to a case when an operator has heard the buzzer sound, notices the cover being open, and puts the cover back on, a case when the operator who has not heard the buzzer sound inserts the check S into the ASF 3 with the cover being open, or the like.

When the operator who has heard the buzzer sound notices the cover being open and puts the cover back on, the medium processing apparatus enters the online state (No in Step S11) to perform a normal process.

Alternatively, when the operator who has not heard the buzzer sound inserts the check S into the ASF 3, with the cover being open, the medium processing apparatus 20 remains in the offline state. Accordingly, since the normal command cannot be analyzed (Yes in Step 11), the status information is transmitted back to the host computer (Step S12).

The above-described steps can be repeated to ring the buzzer several times until the cover of the transport cover is closed.

In this embodiment, as described above, when the medium processing apparatus enters a state where it is necessary to ring the buzzer, the command generating unit 32 generates a specific command (a sound generating command) containing the predetermined code (DLE) in accordance with the status information transmitted from the medium processing apparatus 20. On the side of the medium processing apparatus 20, when the specific command analyzing unit 22 recognizes the predetermined code (DLE) transmitted from the host computer as the sound generating command, the sound generating unit 25 preferentially rings the buzzer.

As a result, it is possible to preferentially ring the buzzer in response to the sound generating command transmitted from the host computer 30, irrespective of either the online state or the offline state of the medium processing apparatus 20.

The ringing pattern of the buzzer sound may be modified in various forms. When the ringing pattern of the buzzer is set in accordance with the type of the status information, the buzzer can be rung in any status. Accordingly, it is possible to notify the operator of the state of the medium processing apparatus 20.

What is claimed is:

1. A medium processing apparatus configured to perform processes on a medium in response to commands from a host computer, the medium processing apparatus comprising:
a receiver configured to receive a first command that contains a predetermined code string and parameters indicative of a ringing pattern for a buzzer sound and a second command that does not contain the predetermined code string and the parameters from the host computer;
a first command analyzer configured to analyze and process only the first command received by the receiver;
a buffer configured to temporarily store at least the second command received by the receiver;
a second command analyzer configured to analyze and process the second command stored in the buffer; and
a sound generator configured to generate the buzzer sound in accordance with the ringing pattern indicated by the parameters when the first command analyzer analyzes the first command and determines that the first command is a sound generating command,
wherein the first command analyzer analyzes the first command before the buffer temporarily stores the first command.

2. The medium processing apparatus as set forth in claim 1, further comprising:
a status information generator configured to generate status information of the image processing apparatus; and
a transmitter configured to transmit the status information generated by the status information generator to the host computer, wherein the parameters contained in the first command is set in the host computer in accordance with the status information.

3. The medium processing apparatus as set forth in claim 1, further comprising:
a reader configured to read medium information from the medium; and
a transmitter configured to transmit the medium information read by the reader to the host computer,
wherein the parameters contained in the first command is set in the host computer in accordance with the medium information.

4. The medium processing apparatus as set forth in claim 1, wherein the first command is a real-time command which is effective even when the medium processing apparatus is in an offline state.

5. The medium processing apparatus as set forth in claim 1, wherein the medium processing apparatus has a transport passage and perform a transport process in which the medium is transported along the transport passage.

6. The medium processing apparatus as set forth in claim 1,
wherein the buffer temporarily stores both the first command that is analyzed and processed by the first command analyzer and the second command, and
wherein the second command analyzer does neither analyze nor process the first command stored in the buffer.

7. A medium processing system comprising:
a host computer; and
a medium processing apparatus configured to perform processes on a medium in response to commands from the host computer,
wherein the host computer includes:
a command generator configured to generate the commands; and
a transceiver configured to transmit the commands generated by the command generator to the medium processing device,
wherein the medium processing apparatus includes:
a receiver configured to receive a first command contains a predetermined code string and parameters indicative of a ringing pattern for a buzzer sound and a second command that does not contain the predetermined code string and the parameters from the host computer;
a first command analyzer configured to analyze and process only the first command received by the receiver;
a buffer configured to temporarily store at least the second command received by the receiver;
a second command analyzer configured to analyze and process the second command stored in the buffer; and
a sound generator configured to generate the buzzer sound in accordance with the ringing pattern indicated by the parameters when the first command analyzer analyzes the first command and determines that the first command is a sound generating command, and
wherein the first command analyzer analyzes the first command before the buffer temporarily stored the first command.

8. The medium processing system as set forth in claim 7,
wherein the medium processing apparatus further includes:
a status information generator configured to generate status information of the image processing apparatus; and
a transmitter configured to transmit the status information generated by the status information generator to the host computer,
wherein the transceiver is configured to receive the status information from the image processing apparatus, and
wherein the command generator generates the first command and set the parameters to be contained in the first command in accordance with the status information received by the transceiver.

9. The medium processing system as set forth in claim 7,
wherein the medium processing apparatus further includes:
a reader configured to read medium information from the medium; and
a transmitter configured to transmit the medium information read by the reader to the host computer,
wherein the transceiver is configured to receive the medium information from the image processing apparatus,
wherein the host computer further includes a determiner configured to recognize the medium information received by the transceiver to produce a determination result, and
wherein the command generator generates the first command and set the parameters to be contained in the first command in accordance with the determination result produced by the determiner.

10. The medium processing system as set forth in claim 7, wherein the first command is a real-time command which is effective even when the medium processing apparatus is in an offline state.

11. The medium processing system as set forth in claim 7, wherein the medium processing apparatus has a transport passage and perform a transport process in which the medium is transported along the transport passage.

12. The medium processing system as set forth in claim 7,
wherein the buffer temporarily stores both the first command that is analyzed and processed by the first command analyzer and the second command, and
wherein the second command analyzer does neither analyze nor process the first command stored in the buffer.

13. A controlling method of a medium processing apparatus configured to perform processes on a medium in response to commands from a host computer, the medium processing apparatus including: a receiver configured to receive a first command that contains a predetermined code string and parameters indicative of a ringing pattern for a buzzer sound and a second command that does not contain the predetermined code string and the parameters from the host computer; a first command analyzer configured to analyze and process only the first command received by the receiver; a buffer configured to temporarily store at least the second command received by the receiver; a second command analyzer configured to analyze and process the second command stored in the buffer; and a sound generator configured to generate the buzzer sound in accordance with the ringing pattern indicated by the parameters when the first command analyzer analyzes the first command and determines that the first command is a sound generating command, the controlling method comprising:
receiving, in the receiver, the first command from the host computer;
analyzing and processing, in the first command analyzer, the first command received by the receiver;
determines, in the first command analyzer, that the first command is a sound generating command; and generating the buzzer sound in accordance with the ringing pattern indicated by the parameters when the first command is the sound generating command, wherein the first command is analyzed by the first command analyzer before the first command is temporarily stored in the buffer.

14. The controlling method as set forth in claim 13, further comprising:

generating status information of the image processing apparatus; and transmitting the generated status information to the host computer, wherein the parameters contained in the first command is set in the host computer in accordance with the status information.

15. The controlling method as set forth in claim 13, wherein the medium processing apparatus further includes a reader configured to read medium information from the medium; and a transmitter configured to transmit the medium information read by the reader to the host computer, the controlling method further comprising:

reading medium information from the medium; and transmitting the read medium information to the host computer, wherein the parameters contained in the first command is set in the host computer in accordance with the medium information.

16. The controlling method as set forth in claim 13, wherein the first command is a real-time command which is effective even when the medium processing apparatus is in an offline state.

17. The controlling method as set forth in claim 13, wherein the medium processing apparatus has a transport passage and performs a transport process in which the medium is transported along the transport passage.

18. The controlling method as set forth in claim 13, wherein the buffer temporarily stores both the first command that is analyzed and processed by the first command analyzer and the second command, and wherein the second command analyzer does neither analyze nor process the first command stored in the buffer.

* * * * *